United States Patent
Speck et al.

(10) Patent No.: US 6,653,974 B1
(45) Date of Patent: Nov. 25, 2003

(54) METHOD FOR CLEARLY DETERMINING THE INTERMEDIATE FREQUENCY DIFFERENCE IN A FREQUENCY-CONTROLLED RADAR SYSTEM

(75) Inventors: Ralph Speck, Friedrichshafen (DE); Joachim Flacke, Markdorf (DE); Bruno Kaiser, Oberschopfheim (DE)

(73) Assignee: Automotive Distance Control Systems GmbH, Lindau (DE)

( * ) Notice: Subject to any disclaimer, the term of this patent is extended or adjusted under 35 U.S.C. 154(b) by 0 days.

(21) Appl. No.: 09/936,389

(22) PCT Filed: Apr. 25, 2000

(86) PCT No.: PCT/EP00/03678
§ 371 (c)(1),
(2), (4) Date: Sep. 10, 2001

(87) PCT Pub. No.: WO00/68705
PCT Pub. Date: Nov. 16, 2000

(30) Foreign Application Priority Data

May 6, 1999 (DE) .......................... 199 20 887

(51) Int. Cl.$^7$ .............................. G01S 7/28; G01S 13/26
(52) U.S. Cl. ................ 342/98; 342/99; 342/118; 342/128; 342/131; 342/132; 342/134; 342/175; 342/195; 342/89
(58) Field of Search ............................. 342/122, 128, 342/129, 130, 131, 132, 133, 165, 166–175, 195, 89–103, 118, 134–144

(56) References Cited

U.S. PATENT DOCUMENTS

| | | | |
|---|---|---|---|
| 5,864,313 A | | 1/1999 | Speck et al. |
| 6,121,919 A | * | 9/2000 | Ameen et al. ............... 342/174 |
| 6,317,076 B1 | * | 11/2001 | Ameen et al. ............... 342/174 |

FOREIGN PATENT DOCUMENTS

| | | | |
|---|---|---|---|
| DE | 4040572 A1 | * 6/1992 | ............ G01S/13/42 |
| DE | 4104907 | 8/1992 | |
| DE | 19512904 | 10/1996 | |
| EP | 0499706 | 8/1992 | |
| GB | 2055001 A | * 2/1981 | ............ G01S/7/40 |

* cited by examiner

*Primary Examiner*—Bernarr E. Gregory
(74) *Attorney, Agent, or Firm*—W. F. Fasse; W. G. Fasse

(57) ABSTRACT

In a method for the determination of the unambiguous range for the measurement of the IF deviation in a frequency-regulated radar system, a frequency adjustment or tuning of the radar system is carried out during the reception of an echo signal by adjustingly setting respectively at least one value for the IF deviation around the value zero in the unambiguous range of the IF deviation as well as in an ambiguous range of the IF deviation. Then, the unambiguous range is recognized as such by comparison of the signal amplitude and/or the number of the detected targets during these adjustment settings, because the unambiguous range exhibits the highest signal amplitude and/or the greatest number of detected targets (i.e. echo signals).

14 Claims, 2 Drawing Sheets

METHOD FOR CLEARLY DETERMINING THE INTERMEDIATE FREQUENCY DIFFERENCE IN A FREQUENCY-CONTROLLED RADAR SYSTEM

FIELD OF THE INVENTION

The invention relates to a method for determining the unambiguous range for the measurement of the intermediate frequency deviation in a frequency-regulated radar system.

BACKGROUND INFORMATION

In frequency pulse radar systems, in which the echo signal is transformed or translated by means of frequency shifting to an intermediate frequency (IF) (as disclosed in German Patent DE 41 04 907 C2 and corresponding published European Patent Application 0,499,706), the frequency spacing between the transmitting- and LO-signal must be constant, so that the IF-signal falls into the IF band. A change of the frequency spacing in free-running oscillators due to external conditions (for example temperature or aging) leads to limitations in the system sensitivity, which can even lead to signal failures or losses.

In many radar systems with free-running oscillators, a frequency regulation can be utilized, with which the frequency deviation of the IF-signal can be measured using the available evaluating algorithms (as disclosed in German Patent DE 195 12 904 C2 and corresponding U.S. Pat. No. 5,864,313). In this method, the effect is used to advantage, that the deviation of the IF-signal from the nominal or rated reference frequency can also be determined in the video signal, and this deviation is large relative to arising Doppler frequencies. A prerequisite for the utilization of the method is the existence of an echo signal, that is to say of a target. After the determination of the IF-deviation, the transmitting- or LO-frequency can be regulated in a corresponding, i.e. tracking or following manner, until the deviation becomes zero.

A block circuit diagram of the method, as it is used, for example, in the radar sensor of a spacing distance regulating automatic speed control for a motor vehicle, is shown in FIG. 1. In the I/Q demodulator, the echo signal (IF-plane) is mixed onto the video plane and thereafter sampled. For the determination of the IF-deviation (special mode in the evaluating algorithm of the radar system) the sampling frequency $f_S$ is adjustingly set higher than in the signal processing for the detection of targets. From the phase difference of the sampled signals, the frequency shifting of the IF-signal may be determined and a corresponding value for the frequency detuning (tuning voltage $U_A$) can be input into the front end.

The frequency range that can be unambiguously measured with the above described method is dependent on the sampling frequency $f_S$. The relationship between the actual IF-deviation $\Delta IF$ and the IF-deviation $\Delta IF_{Meas}$ determined with a sampling frequency $f_S$ is shown in FIG. 2. Within the interval of $\pm f_S/2$, the IF-deviation can be unambiguously determined (unambiguous range), in the other ranges, ambiguities arise due to the under-sampling (ambiguous ranges).

For example, if the frequency measurement is carried out with a sampling frequency of 60 MHz, an unambiguous range of ±30 MHz can be achieved.

Under consideration of the mechanisms that typically lead to frequency detuning, in typical radar systems it can be assumed that the time constants of the frequency detuning are very large. Thus, in the typical operation of the radar system with an adequately frequent measurement of the frequency offset and sufficiently rapid regulation to the nominal or rated frequency, the unambiguous range of the frequency measurement will not be outside of $\pm f_S/2$. When switching on the system, however, it cannot be assumed, that the IF-deviation lies in the unambiguous range of the measurement.

SUMMARY OF THE INVENTION

It is thus the object of the invention to improve the method for determining the IF-deviation according to the above discussed prior art in such a manner so that the unambiguous range can be identified. By corresponding frequency adjustment or tuning it can then be ensured that the measurement of the IF-deviation is achieved in the unambiguous range.

The above object has been achieved according to the invention in a method of determining an unambiguous range for a measurement of an IF-deviation in a frequency-regulated radar system, comprising receiving echo signals and carrying out a frequency adjustment of the radar system to respective adjustment settings during the receiving of the echo signals by setting at least one respective value around zero for the IF-deviation respectively in a first range and a second range of the IF-deviation, and recognizing the unambiguous range among the first range and the second range by comparing at least one of a signal amplitude and a number of targets that are detected respectively at the respective adjustment settings. In a first embodiment, the carrying out of the frequency adjustment comprises running in frequency steps through a certain frequency range that at least partially covers the unambiguous range and an ambiguous range. In a second embodiment, the carrying out of the frequency adjustment comprises: pre-specifying a fixed frequency starting value; measuring the IF-deviation at the fixed frequency starting value; carrying out a balancing adjustment to adjust to zero the IF-deviation that was measured; mixing the echo signals into a video plane and then sampling the echo signals at a sampling frequency; and carrying out an adjusted setting of a frequency offset relative to the fixed frequency starting value, wherein the frequency offset essentially corresponds to the sampling frequency.

The above objects have further been achieved according to the invention in a method of operating a frequency-regulated radar system comprising the following steps:

a) emitting a transmitted signal at a transmission frequency, and reflecting said transmitted signal from at least one target object to form a reflected echo signal including at least one echo signal pulse corresponding to said at least one target object;

b) receiving said echo signal, and mixing said echo signal with a reference frequency to form an intermediate frequency;

c) determining an IF-deviation of said intermediate frequency relative to said reference frequency;

d) adjusting at least one of said transmission frequency and said reference frequency;

e) carrying out said steps c) and d) to an extent to minimize said IF-deviation to near or equal to zero at a first tuned frequency in a first frequency tuning range of said at least one of said transmission frequency and said reference frequency;

f) detecting at least one of a first signal amplitude of said echo signal and a first number of said echo signal pulses of said echo signal received when said at least one of said transmission frequency and said reference frequency is adjusted to said first tuned frequency;

g) repeating said steps c) and d) to minimize said IF-deviation to near or equal to zero at a second tuned frequency in a second frequency tuning range of said at least one of said transmission frequency and said reference frequency, wherein said second frequency tuning range is distinct from said first frequency tuning range;

h) detecting at lest one of a second signal amplitude of said echo signal and a second number of said echo signal pulses of said echo signal received when said at least one of said transmission frequency and said reference frequency is adjusted to said second tuned frequency;

i) recognizing said first frequency tuning range as an unambiguous range of said IF-deviation and said second frequency tuning range as an ambiguous range of said IF-deviation if said first signal amplitude is greater than said second signal amplitude or said first number of said echo signal pulses is greater than said second number of said echo signal pulses, or recognizing said second frequency tuning range as an unambiguous range of said IF-deviation and said first frequency tuning range as an ambiguous range of said IF-deviation if said second signal amplitude is greater than said first signal amplitude or said second number of said echo signal pulses is greater than said first number of said echo signal pulses; and j) adjusting said at least one of said transmission frequency and said reference frequency into said unambiguous range, and then operating said radar system in said unambiguous range.

BRIEF DESCRIPTION OF THE DRAWINGS

The invention will be described in greater detail in connection with drawings.

DETAILED DESCRIPTION OF THE INVENTION

Figure 1:
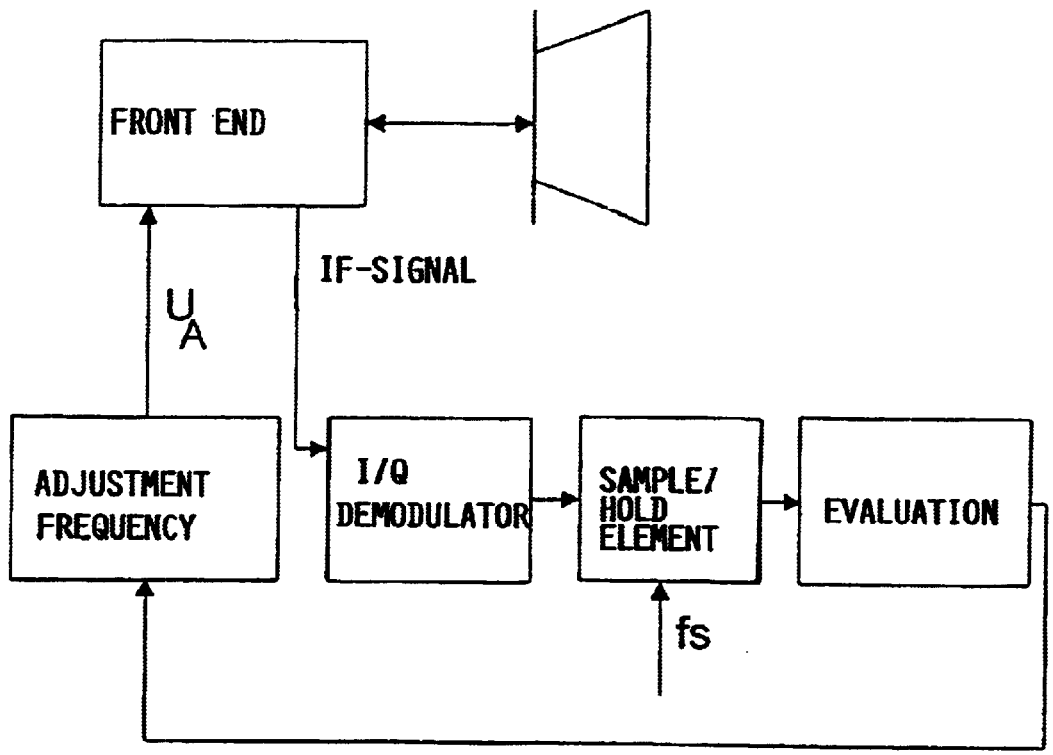
FIG. 1 shows a block circuit diagram for determining the IF-deviation according to the German Patent DE 195 12 904 C2, as described in the introductory portion of the present specification.
Figure 2:
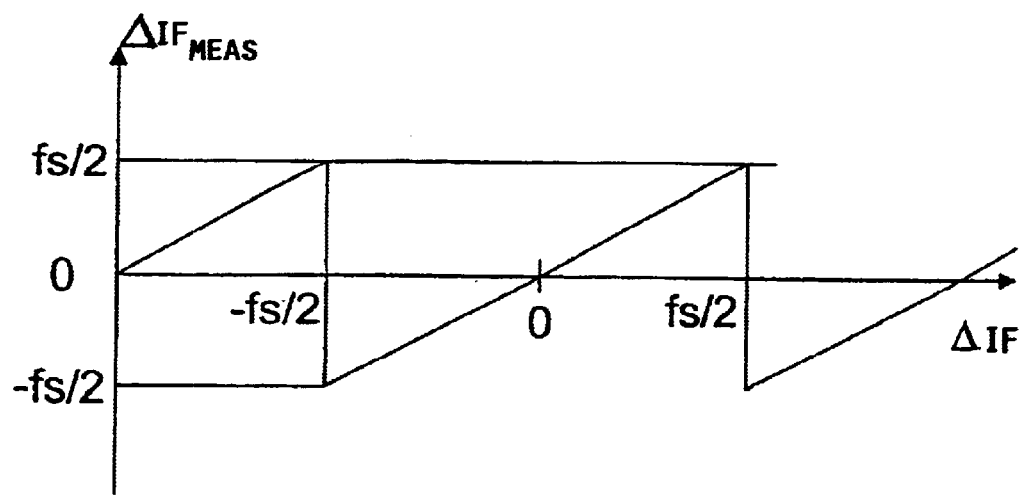
FIG. 2 shows an illustration of an IF-deviation $\Delta IF_{Meas}$ determined with a sampling frequency $f_S$ over the actual IF-deviation $\Delta IF$ according to the method of the German Patent DE 195 12 904 C2, as described in the introductory portion of the present specification.
Figure 3:
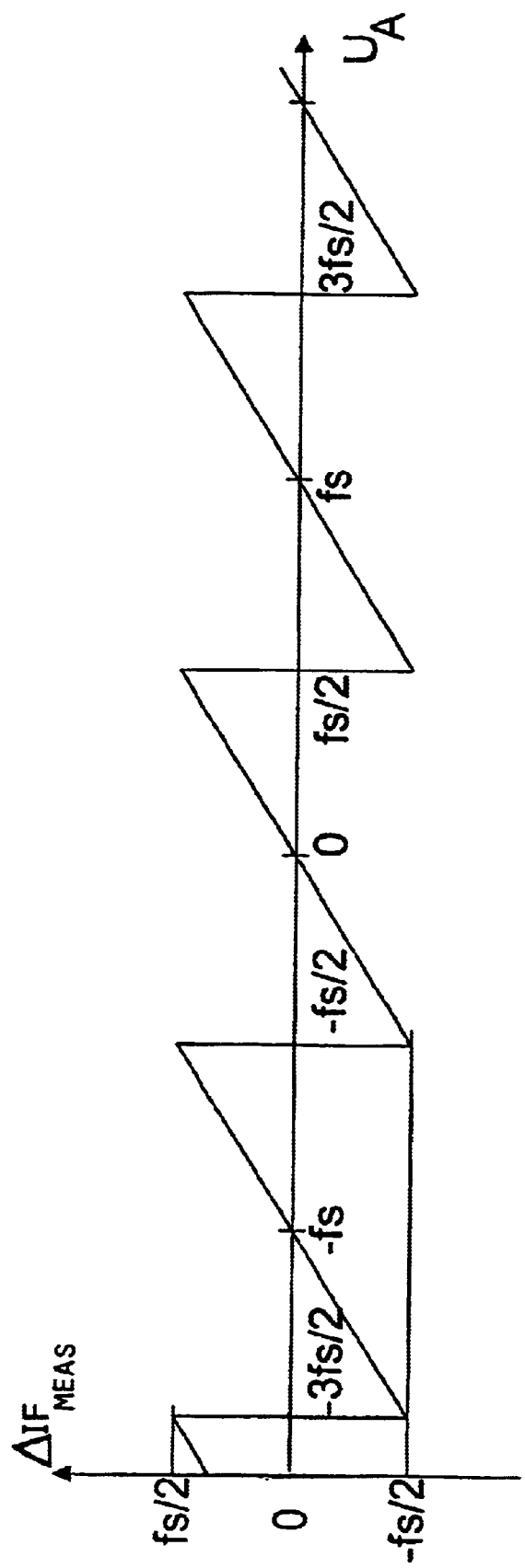
FIG. 3 shows an illustration of the IF-deviation $\Delta IF_{Meas}$ determined with a sampling frequency $f_S$ over the tuning voltage $U_A$ of the radar system according to the inventive method.

The essential feature recognized by and underlying the invention will be explained in connection with FIG. 3. If, upon the presence of an echo signal, one progresses through the complete frequency range of the frequency adjustment or tuning and thereby measures respectively the IF-deviation $\Delta IF_{Meas}$, thereby one obtains a curve, of which the curve pattern or progression is similar to that shown in FIG. 2, whereby however the IF-deviation $\Delta IF$ is replaced by the tuning voltage $U_A$. In FIG. 3, this curve is illustrated with an expanded range of the IF-deviation. From the curve it is evident, that in the ranges $-3\ f_S/2\ \ldots\ -f_S/2$ and $f_S/2\ \ldots\ 3\ f_S/2$ tuning to the phase value 0 (corresponding to $\Delta IF_{Meas}=$ 0) would lead to an apparent IF-deviation ($=-f_S$ or $+f_S$) which lies above or below the actual IF-deviation ($=0$) by the sampling frequency $f_S$. However, the deviation by $\pm f_S$ from the actual IF causes a considerable reduction of the signal amplitude as well as a reduction of the number of detected targets, i.e. echo signals, due to filter characteristics and due to the sampling. According to the invention, this effect is used in order to determine the unambiguous range of the regulation.

For this purpose, a frequency adjustment or tuning of the radar system is carried out during the reception of echo signals while adjustingly setting respectively at least one value of around zero for the IF-deviation $\Delta IF_{Meas}$, both in the unambiguous range of the IF-deviation as well as in an ambiguous range of the IF-deviation. By comparison of the signal amplitudes of the detected targets that are determined during these adjustments, and/or of the number of the detected targets, i.e. echo signals, the unambiguous range can be recognized as such and can be distinguished from the ambiguous ranges, because the unambiguous range exhibits the highest signal amplitude and/or the greatest number of detected targets.

The variation of the tuning voltage $U_A$ must be achieved in a time range in which signal fluctuations of the echo signal due to target fluctuations or variations are smaller than the amplitude fluctuations expected due to the IF-detuning. The following two embodiments can be especially advantageously utilized:

1) The tuning voltage or frequency adjustment control voltage of the oscillator is run through the entire tuning range in coarse steps (~5 MHz). In each step, the IF-deviation is determined (according to German Patent DE 195 12 904 C2) and the number of the targets as well as an average value of the target amplitudes are determined. After the complete tuning range has been run through, the adjusted settings with IF-deviation near or identical to 0 are compared with respect to the number of targets or echo signals and the signal amplitudes that were detected respectively for each of those adjusted settings. The adjusted setting with the best result, i.e. the greatest number of targets and/or the greatest signal amplitude, is selected as a starting setting. In this context, the criteria of the number of targets and of the magnitude of the signal amplitudes can go into the calculation with different weightings.

2) The frequency adjustment or tuning is carried out with a prescribed starting value of the tuning voltage, i.e. the oscillator adjustment, which may, for example, be the average tuning voltage or a starting value that was determined upon initially placing the radar sensor into operation. After adjusting or balancing the IF-deviation $\Delta IF_{Meas}$ to 0, a fixed frequency offset of approximately. $+f_S$ is adjustingly set. Thereafter, the number of the targets and/or their amplitudes are compared at these two adjusted settings. An increase of the number of targets as well as the amplitudes thereof means that the new adjusted setting lies in the unambiguous range (a detuning by $>2\ f_S$ can generally be excluded). On the other hand, if there is a reduction of the number of targets and their amplitudes, then the same detuning and subsequent comparison is carried out in the other direction, i.e. with a negative frequency offset $-f_S$. After carrying out these investigations, the unambiguous range has been established.

The described measures only need to be carried out once after switching on the system, because the detuning of the IF during the operation of the system beyond the unambiguous range can be excluded according to previous understandings as discussed above.

The above embodiment 1), in contrast to embodiment 2), can get by without a fixed pre-adjustment or pre-setting. The non-linearity between the frequency progression and the tuning voltage is compensated by the relatively weak amplitude reductions close to and around the zero point of the IF-deviation.

In the above embodiment 2), the investigation with respect to the unambiguous range is only started after a tuning voltage with an IF-deviation of 0 has been established. For carrying it out, in comparison to embodiment 1), substantially less time is necessary (max. 2 additional frequency adjustments or settings). Also, the target fluctuation does not come to bear so significantly, because all targets out of the measuring range are considered.

Example (spacing distance radar sensor in a motor vehicle):

tuning range ΔIF 100 MHz duration for a frequency measurement 350 ms

With three successive frequency measuring cycles with different frequencies, as suggested in embodiment 2), a total measuring duration of $T_{Meas} \approx 1$ sec is necessary. In this time, the target scenario changes only insignificantly so that the determination of the unambiguous range can be achieved with sufficient accuracy.

It should be ensured, that at least one frequency measurement can be completed in the unambiguous range within the required 350 ms, that is to say that the signal-to-noise ratio or separation is sufficient. During the entire measuring duration ($T_{Meas}$) no strong change of the IF should arise (changes occurring with changing temperature in the warm-up phase).

What is claimed is:

1. A method of determining an unambiguous range for a measurement of an IF-deviation in a frequency-regulated radar system, comprising receiving echo signals and carrying out a frequency adjustment of the radar system to respective adjustment settings during the receiving of the echo signals by setting at least one respective value for the IF-deviation respectively in a first range and a second range of the IF-deviation, and recognizing the unambiguous range among the first range and the second range by carrying out at least one of:

comparing with one another respective signal amplitudes that are detected respectively at the respective adjustment settings; and comparing with one another respective numbers of targets that are detected respectively at the respective adjustment settings.

2. The method according to claim 1, wherein the carrying out of the frequency adjustment comprises running in frequency steps through a certain frequency range that at least partially covers the unambiguous range and an ambiguous range.

3. The method according to claim 1, wherein the carrying out of the frequency adjustment comprises:

pre-specifying a fixed frequency starting value;

measuring the IF-deviation at the fixed frequency starting value;

carrying out a balancing adjustment to adjust to zero the IF-deviation that was measured;

mixing the echo signals into a video plane and then sampling the echo signals at a sampling frequency; and carrying out an adjusted setting of a frequency offset relative to the fixed frequency starting value, wherein the frequency offset essentially corresponds to the sampling frequency.

4. The method according to claim 3, wherein the frequency offset is a positive or a negative frequency offset.

5. The method according to claim 3, wherein the adjusted setting of the frequency offset comprises sequentially setting a positive frequency offset and a negative frequency offset.

6. A method of operating a frequency-regulated radar system comprising the following steps:

a) emitting a transmitted signal at a transmission frequency, and reflecting said transmitted signal from at least one target object to form a reflected echo signal including at least one echo signal pulse corresponding to said at least one target object;

b) receiving said echo signal, and mixing said echo signal with a reference frequency to form an intermediate frequency;

c) determining an IF-deviation of said intermediate frequency relative to said reference frequency;

d) adjusting at least one of said transmission frequency and said reference frequency;

e) carrying out said steps c) and d) to an extent to minimize said IF-deviation at a first tuned frequency in a first frequency tuning range of said at least one of said transmission frequency and said reference frequency;

f) detecting at least one of a first signal amplitude of said echo signal and a first number of said echo signal pulses of said echo signal received when said at least one of said transmission frequency and said reference frequency is adjusted to said first tuned frequency;

g) repeating said steps c) and d) to minimize said IF-deviation at a second tuned frequency in a second frequency tuning range of said at least one of said transmission frequency and said reference frequency, wherein said second frequency tuning range is distinct from said first frequency tuning range;

h) detecting at least one of a second signal amplitude of said echo signal and a second number of said echo signal pulses of said echo signal received when said at least one of said transmission frequency and said reference frequency is adjusted to said second tuned frequency;

i) recognizing said first frequency tuning range as an unambiguous range of said IF-deviation and said second frequency tuning range as an ambiguous range of said IF-deviation if said first signal amplitude is greater than said second signal amplitude or said first number of said echo signal pulses is greater than said second number of said echo signal pulses, or recognizing said second frequency tuning range as an unambiguous range of said IF-deviation and said first frequency tuning range as an ambiguous range of said IF-deviation if said second signal amplitude is greater than said first signal amplitude or said second number of said echo signal pulses is greater than said first number of said echo signal pulses; and j) adjusting said at least one of said transmission frequency and said reference frequency into said unambiguous range, and then operating said radar system in said unambiguous range.

7. The method according to claim 6, further comprising repeating said steps c) and d) to minimize said IF-deviation at a third tuned frequency in a third frequency tuning range of said at least one of said transmission frequency and said reference frequency, wherein said third frequency tuning range is distinct from said first and second frequency tuning ranges, and further comprising detecting at least one of a third signal amplitude of said echo signal and a third number of said echo signal pulses of said echo signal received when said at least one of said transmission frequency and said reference frequency is adjusted to said third tuned frequency, and wherein said step i) further comprises recognizing as said unambiguous range, a particular one of said first, second and third frequency tuning ranges having at least one of a greatest one of said first, second and third signal amplitudes and a greatest one of said first, second and third numbers of said echo signal pulses, and recognizing respectively as said ambiguous range respective ones of said first, second and third frequency tuning ranges other than said particular one.

8. The method according to claim 6, wherein said determining of said IF-deviation comprises processing and sampling said intermediate frequency at a sampling frequency, wherein each one of said frequency tuning ranges of said at least one of said transmission frequency and said reference frequency spans a frequency interval that corresponds to said sampling frequency.

9. The method according to claim 6, wherein said adjusting of said step d) comprises stepping in frequency steps through an entire frequency spectrum that includes said first frequency tuning range and said second frequency tuning range and that covers said unambiguous range and said ambiguous range of said IF-deviation, said step c) is carried out at each one of said frequency steps, and said steps e) and g) comprise selecting ones of said frequency steps at which said IF-deviation is minimized.

10. The method according to claim 6, wherein said step i) comprises recognizing as said unambiguous range, a particular one of said frequency tuning ranges having both said signal amplitude that is greater and said number of echo signal pulses that is greater than said signal amplitude and said number of echo signal pulses respectively of another one of said frequency tuning ranges.

11. The method according to claim 10, wherein each one of said signal amplitudes is weighted by a first weighting factor and each one of said numbers of said echo signal pulses is weighted by a second weighting factor different from said first weighting factor, before carrying out said step i).

12. The method according to claim 6, wherein said steps c) to h) comprise:

setting said at least one of said transmission frequency and said reference frequency to a fixed frequency starting value;

carrying out said step c) at said fixed frequency starting value;

if said IF-deviation at said fixed frequency starting value is not zero, then further adjusting said at least one of said transmission frequency and said reference frequency and repeating said step c) until said IF-deviation is zero at a first zeroing frequency;

adjusting said at least one of said transmission frequency and said reference frequency to a second zeroing frequency that is offset from said first zeroing frequency by a positive or negative frequency offset; and carrying out said steps f) and h) respectively using said first zeroing frequency as said first tuned frequency and said second zeroing frequency as said second tuned frequency.

13. The method according to claim 12, wherein said determining of said IF-deviation comprises processing and sampling said intermediate frequency at a sampling frequency, and wherein said frequency offset corresponds to said sampling frequency.

14. The method according to claim 12, wherein said second zeroing frequency is offset from said first zeroing frequency by said positive frequency offset, and further comprising adjusting said at least one of said transmission frequency and said reference frequency to a third zeroing frequency that is offset from said first zeroing frequency by a negative frequency offset which has a same absolute value as said positive frequency offset, and detecting at least one of a third signal amplitude of said echo signal and a third number of said echo signal pulses of said echo signal received when said at least one of said transmission frequency and said reference frequency is adjusted to said third zeroing frequency.

* * * * *